United States Patent [19]
Wilson et al.

[11] Patent Number: 5,598,154
[45] Date of Patent: Jan. 28, 1997

[54] APPARATUS AND METHOD FOR GENERATING AND UTILIZING PSEUDONOISE CODE SEQUENCES

[75] Inventors: Michael L. Wilson, Salt Lake City; John W. Zscheile, Jr., West-Farmington; Richard J. Saggio; Alan E. Lundquist, both of Salt Lake City, all of Utah

[73] Assignee: Unisys Corporation, Blue Bell, Pa.

[21] Appl. No.: 348,669

[22] Filed: Dec. 2, 1994

[51] Int. Cl.$^6$ ........................................ H03M 7/00
[52] U.S. Cl. .................. 341/50; 364/717; 380/46; 375/208
[58] Field of Search .................. 341/50; 370/22; 364/727, 717; 375/208–210; 380/46

[56] References Cited

U.S. PATENT DOCUMENTS

| | | | |
|---|---|---|---|
| 5,043,988 | 8/1991 | Brglez et al. | 371/27 |
| 5,103,459 | 4/1992 | Gilhousen et al. | 375/1 |
| 5,153,532 | 10/1992 | Albers et al. | 331/78 |
| 5,323,338 | 6/1994 | Hawthorne | 364/717 |

*Primary Examiner*—Howard L. Williams
*Assistant Examiner*—Jason L. W. Kost
*Attorney, Agent, or Firm*—John B. Sowell; Mark T. Starr; John F. O'Rourke

[57] ABSTRACT

A set of independent pseudonoise (PN) component codes greater than two are combined in a manner which produces one or more I and Q uncorrelated orthogonal pairs of resulting combined PN sequences. At least two of the component codes in a resulting combined PN sequence are combined in a manner which produces an overall imbalance of ones and zeros in the binary expression of the resulting combined PN sequence so that the resulting composite code has a partial correlation with a predetermined one of the PN component codes. In the preferred embodiment, three component codes are combined to produce uncorrelated orthogonal pairs of composite codes wherein at least one of the pairs of composite codes is produced to have a partial correlation with one or more of the component codes.

11 Claims, 11 Drawing Sheets

$X \oplus Y \cdot Z \leftrightarrow \bar{X} \oplus Y \cdot Z$ $X \oplus \bar{Y} \cdot Z \leftrightarrow \bar{X} \oplus \bar{Y} \cdot Z$ $X \oplus Y \cdot \bar{Z} \leftrightarrow \bar{X} \oplus Y \cdot \bar{Z}$ $X \oplus \bar{Y} \cdot \bar{Z} \leftrightarrow \bar{X} \oplus \bar{Y} \cdot \bar{Z}$ $\{(X \oplus Y \cdot Z) + (X \oplus \bar{Y} \cdot Z) + (X \oplus Y \cdot \bar{Z}) + (X \oplus \bar{Y} \cdot \bar{Z})\} \leftrightarrow \{(\bar{X} \oplus Y \cdot Z) + (\bar{X} \oplus \bar{Y} \cdot Z) + (\bar{X} \oplus Y \cdot \bar{Z}) + (\bar{X} \oplus \bar{Y} \cdot \bar{Z})\}$

FIG 2

APPARATUS AND METHOD FOR GENERATING AND UTILIZING PSEUDONOISE CODE SEQUENCES

FIELD OF THE INVENTION

The present invention relates to pulse or digital communications and more particularly to spread spectrum communications using plural paths or channels.

BACKGROUND OF THE INVENTION

A pseudonoise (PN) sequence has been defined as a binary sequence with a very desirable transorthogonal autocorrelation property, commonly used in space communications for synchronization and ranging (G. P. Kurpis, Chair, IEEE Std 100-1992 *The New IEEE Standard Dictionary of Electrical and Electronics Terms*, 5th ed. (IEEE, New York, 1993) p. 1024). A direct sequence spread spectrum communication system uses such PN codes. In one such system, a low frequency signal and a high frequency signal are received and amplified. If the low frequency signal occupies a frequency band for example one kilohertz wide centered at 5 megahertz, and the high frequency signal occupies a band for example 10 kilohertz wide centered at 20 megahertz, then if those two signals are run through a common amplifier circuit in separate bands, then the high frequency signal, being in a wider band, will absorb most of the power provided by the amplifier. If the two signals use different frequencies, and their bands do not overlap, then the wider band will absorb most of the available power. As a result, the effective transmission distance for the low frequency signal will be considerably less than that of the high frequency signal. To avoid that problem, the low frequency and high frequency signals can be separately modulated using spreading or PN codes to spread each band to have an identical bandwidth of, for this example, 100 kilohertz each. As so modulated, both the high frequency signal and the low frequency signal now each occupy an equally wide band and absorb power equally, and therefore can be transmitted for essentially the same distance. Previously, this problem would be avoided by using separate power amplifiers for each band so that each band shares power equally. However, such an arrangement has the disadvantage of requiring duplicate (or triplicate or more) circuitry.

In the prior art, it was known that two or more PN component codes could be combined to create a longer and more complex composite code. U.S. Pat. No. 4,809,295 issued Feb. 28, 1989 for "Code Lengthening System" by John W. Zscheile, Jr. et al describes a method and apparatus for generating a composite code having correlation properties between the component codes. Having correlation properties between the component codes is desirable so that a receiver can lock onto a longer such PN code as easily as for a shorter PN code.

In U.S. Pat. No. 4,225,935 issued Sep. 30, 1980 for "Coding Method and System with Enhanced Security" by John W. Zscheile, Jr. et al, the system referenced therein combines individual PN component codes to provide a PN composite code having a code length equal to the product of the individual PN component code lengths. Creating a composite PN code from individual component PN codes permits the acquisition of the first, which is usually the shortest, PN component code first. After lock-on employing code locked loops, the next, which is usually the next shortest, PN component code is acquired. Sequentially, each of the PN component codes may thus be acquired in order of increasing length until all PN component codes are acquired so as to reproduce the PN composite code.

Thus, there is a need to generate multiple sets of orthogonal pairs of PN codes. The present invention fulfills this need.

Using coherent signal receiving apparatus to receive data signals has several advantages. As a prime example, coherent reception of data improves or increases the ratio of the energy contained in the data bits to the energy of the background noise. This is similar to an improved signal to noise ratio. Also, coherent reception greatly improves the circuitry and structure necessary to receive the transmitted data signals. Coherent reception of data modulated onto a carrier implies that the absolute phase of the carrier signal is known so that the carrier signal can be tracked and removed at the receiver.

One prior art coherent receiving system employs a pilot signal which is not modulated by the data signal. The unmodulated pilot signal may be tracked and removed, and enables the receiving system to determine the absolute phase of the carrier signal. When the absolute phase of the carrier signal is known, the carrier signal may also be removed, leaving the demodulated data signal which may then be coherently detected. When this type of coherent modulation is employed at the transmitter, a portion of the total available power is consumed by the pilot signal and is so not available at the transmitter for data transmission nor at the receiver for detection.

U.S. Pat. No. 4,435,822 issued Mar. 6, 1984 for "Coherent Spread Spectrum Receiving Apparatus" by B. M. Spencer et al. explains that the pilot signal may be transmitted over a very short period of time to permit the receiving system to lock onto the transmitted pilot signal. The data signal is then transmitted without the pilot signal. In such an improved time-sharing system, the power available for data transmission is thereby enhanced. Also, in such a time-sharing system, less time is available for the transmission of data which effectively results in a slight degradation of the signal-to-noise ratio.

Both of the above-identified coherent receiving systems require special designed tracking circuitry to achieve the coherent reception of data.

It would therefore be desirable to provide a coherent spread spectrum receiving system that does not degrade the signal-to-noise ratio of the transmitted data signal and does not require any special design tracking circuitry to achieve coherent reception of data.

SUMMARY OF THE INVENTION

Accordingly, an object of the present invention is to provide apparatus and method for generating orthogonal pairs of PN codes.

Another object of the present invention is to provide apparatus and method for producing orthogonal PN code pairs, composed of a single set of component codes.

Another object of the present invention is to provide apparatus and method for generating antipodal sets of PN codes, wherein each such set consists of mutually orthogonal PN codes.

A further object of the present invention is to provide apparatus and method for generating a plurality of orthogonal PN code pairs from the same component codes.

Still another object of the present invention is to provide apparatus and method for generating PN code sequences.

Yet another object of the present invention is to provide apparatus and method for producing orthogonal PN code pairs using only one set of code generators to make one or more orthogonal pairs, thereby saving hardware.

A still further object of the present invention is to provide apparatus and method for producing an orthogonal pair of I (in-phase) and Q (quadrature) PN codes composed of a plurality of (e.g. 3) individual component codes, in which the same component codes are used to produce both of the I and Q composite codes.

Still another object of the present invention is to provide apparatus and method for generating I and Q PN codes using the same X-code on both codes of the I and Q pair.

Yet another object of the present invention is to provide apparatus and method for generating orthogonal pairs of PN codes for a plurality of (e.g. 3) types of composite PN codes, using the same set of component code generators.

Briefly, these and other objects of the present invention are accomplished by apparatus and method for producing orthogonal PN code pairs, composed of a single set of component codes, using a combination of a second phase of one of the component codes and inverting another phase of that component code to produce two orthogonal codes from the same sequences. The resulting composite I and Q codes have certain desirable partial correlation properties, which result from the proper combining of the component codes. The composite codes are produced by combining the component code sequences to produce a much longer sequence.

Other objects, advantages and novel features of the invention will become apparent from the following detailed description of the invention when considered in conjunction with the accompanying drawings.

BRIEF DESCRIPTION OF THE DRAWINGS

In the drawings,

FIGS. 2 and 2A illustrate how the desirable mutual orthogonality property can be achieved in accordance with the present invention, and each show a Venn diagram or logic map showing how two antipodal sets of mutually orthogonal codes according to the present invention can be constructed using the generator of FIG. 1 or the generator of FIG. 1A;

FIG. 3 is a functional block diagram of a PN code generator that can be utilized as the X PN code generator in the system of FIG. 1;

DESCRIPTION OF THE PREFERRED EMBODIMENTS.

Some of the terminology employed below has been employed in prior art patents such as U.S. Pat. No. 4,225,935 issued Sep. 30, 1980 for "Coding Method and System with Enhanced Security" by John W. Zscheile, Jr. et al and U.S. Pat. No. 3,728,529 issued Apr. 17, 1973 for "Two-Way Communication System Employing Two-Clock Frequency Pseudo-Noise Signal Modulation" by Earl M. Kartchner et al, both assigned to the same assignor as this application, and also in references cited in those patents. The Zscheile, Jr. et al '935 patent, and the Kartchner et al patent, are hereby incorporated by reference herein.

Figure 1:
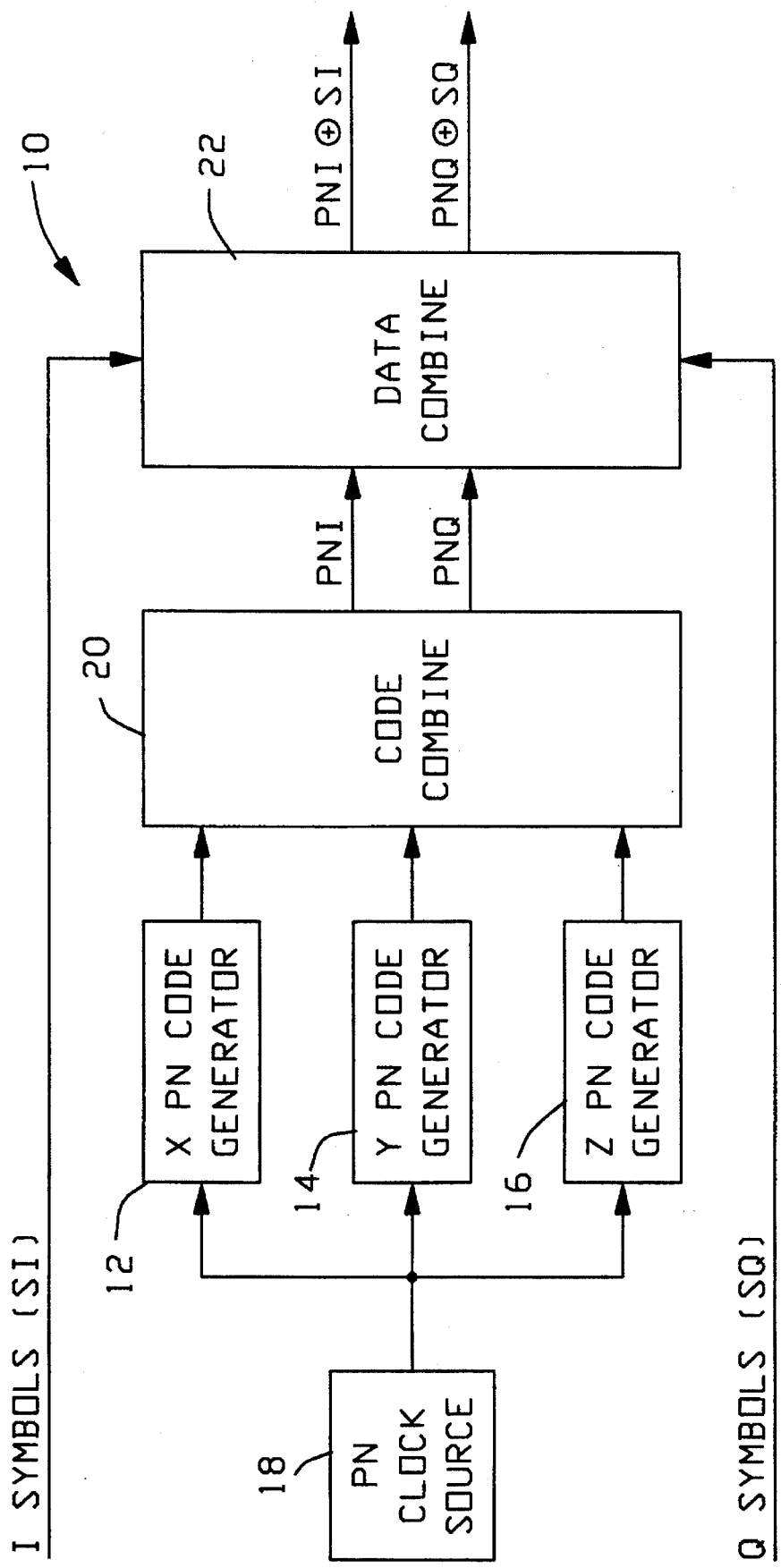
FIG. 1 is a top level block diagram of a PN code generator and modulator according to the present invention.

Referring now to the drawings, wherein like reference characters designate like or corresponding parts throughout the several views, there is shown in FIG. 1 a PN code generator and modulator 10 including an X PN code generator 12, a Y PN code generator 14, a Z PN code generator 16, a PN clock source 18 clocking generators 12–16, a code combiner 20 for combining the output of generators 12–16 to produce an I-PN code and a Q-PN code, and a data combiner 22 wherein input data is modulated with the codes produced by combiner 20. The I code and Q code are mutually orthogonal, so that the I and Q channels do not interfere with each other. A code should be orthogonal to anything other than the desired signal to be acquired.

FIG. 1 in part shows apparatus and method for generating orthogonal pairs of PN codes for three types of composite PN codes, using the same set of component code generators 12–16. The composite codes are produced by combining the component code sequences to produce a much longer sequence. In the present invention, the component code sequences are so combined to produce composite codes with specific desirable or needed properties. PN codes are used in various applications, such as a direct sequence spread spectrum communications system. The system of FIG. 1 and FIG. 9 generates three types of composite PN code sequences, generated by combining the same set of component codes using different combining logic. The system of FIG. 1 and FIG. 9 furthermore produces an orthogonal pair of each of these three composite PN code sequences, for use on a QPSK (Quadrature Phase Shift Keying) waveform. Producing the needed orthogonal I and Q PN code pairs using the same set 12–16 of component code generators reduces the amount of needed hardware.

As shown in FIG. 1, PN code generator and modulator 10 independently generates three PN codes (respectively designated as X, Y and Z) and combines these three codes using the combinatorial logic 22 shown in greater detail in FIGS. 6–9. The resulting I-PN and Q-PN codes produced by code combiner 20 are then combined by data combiner 22 with the I and Q data symbols (or data signals) by modulo-2 combining the respective data symbols with the corresponding PN codes. This data is clocked in by PN clock source 18 via divider 24. Divider 24 divides the output of source 18 by a power of 2. Thus, generator 10 produces three types of composite PN code sequences, generated by combining the same set of component codes using different combining logic, as further discussed below with regard to FIGS. 6–9. Combiner 20 and combiner 22 each produce paired codes, with one of each pair being an I-PN (in-phase PN) code, and the other member of that pair being a Q-PN (in quadrature relationship PN) code. The resulting I-PN and Q-PN codes are then combined with the corresponding I or Q data as shown in FIGS. 6–9 and discussed below. The X-PN, Y-PN and Z-PN codes are respectively generated by X-PN code generator 12 (shown in greater detail in FIG. 3), Y-PN code generator 14 (shown in greater detail in FIG. 4) and Z-PN code generator 16 (shown in greater detail in FIG. 5).

Figure 1A:
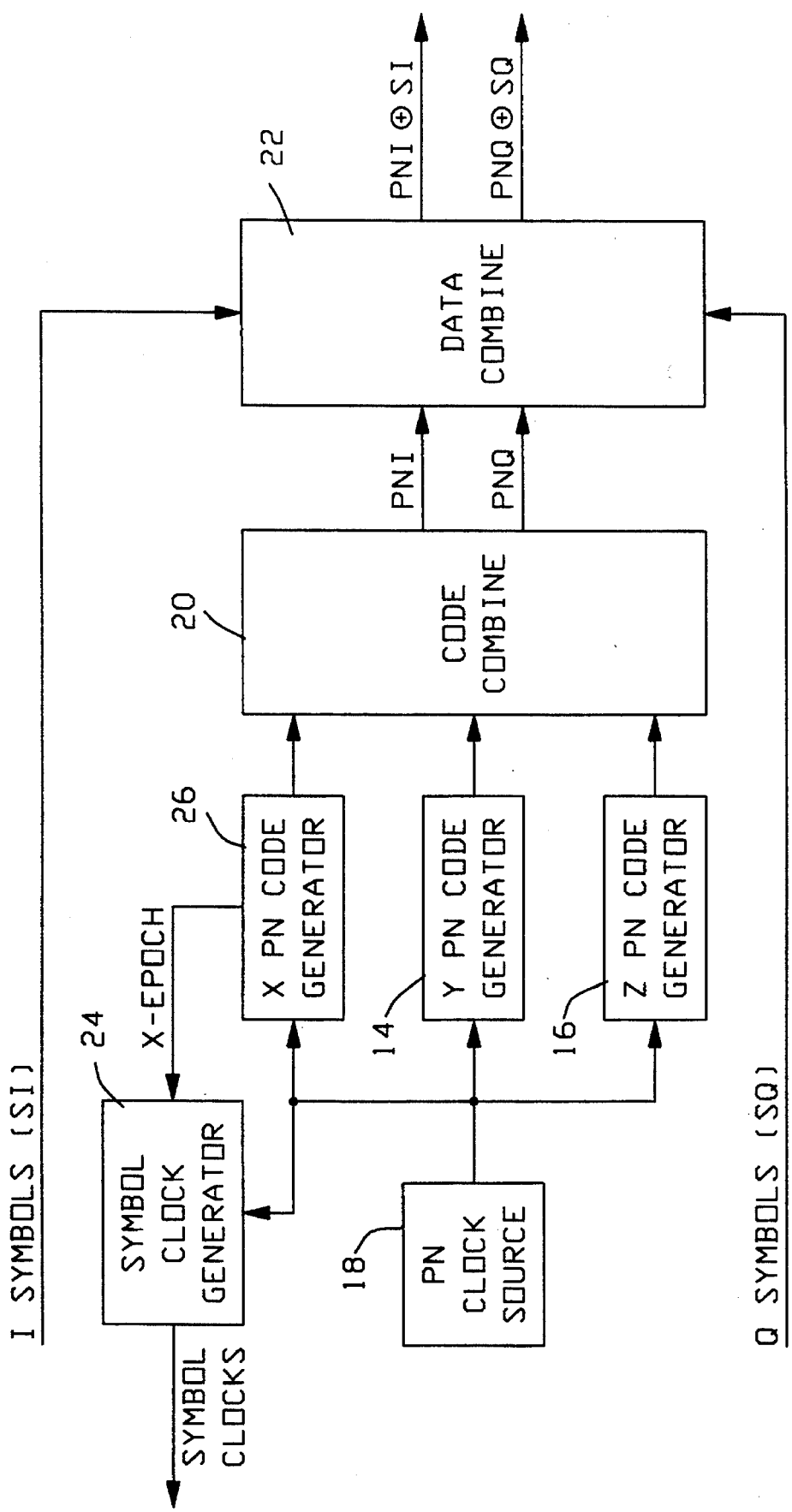
FIG. 1A is a top level block diagram of an alternative embodiment of a PN code generator and modulator according to the present invention.
Figure 10:
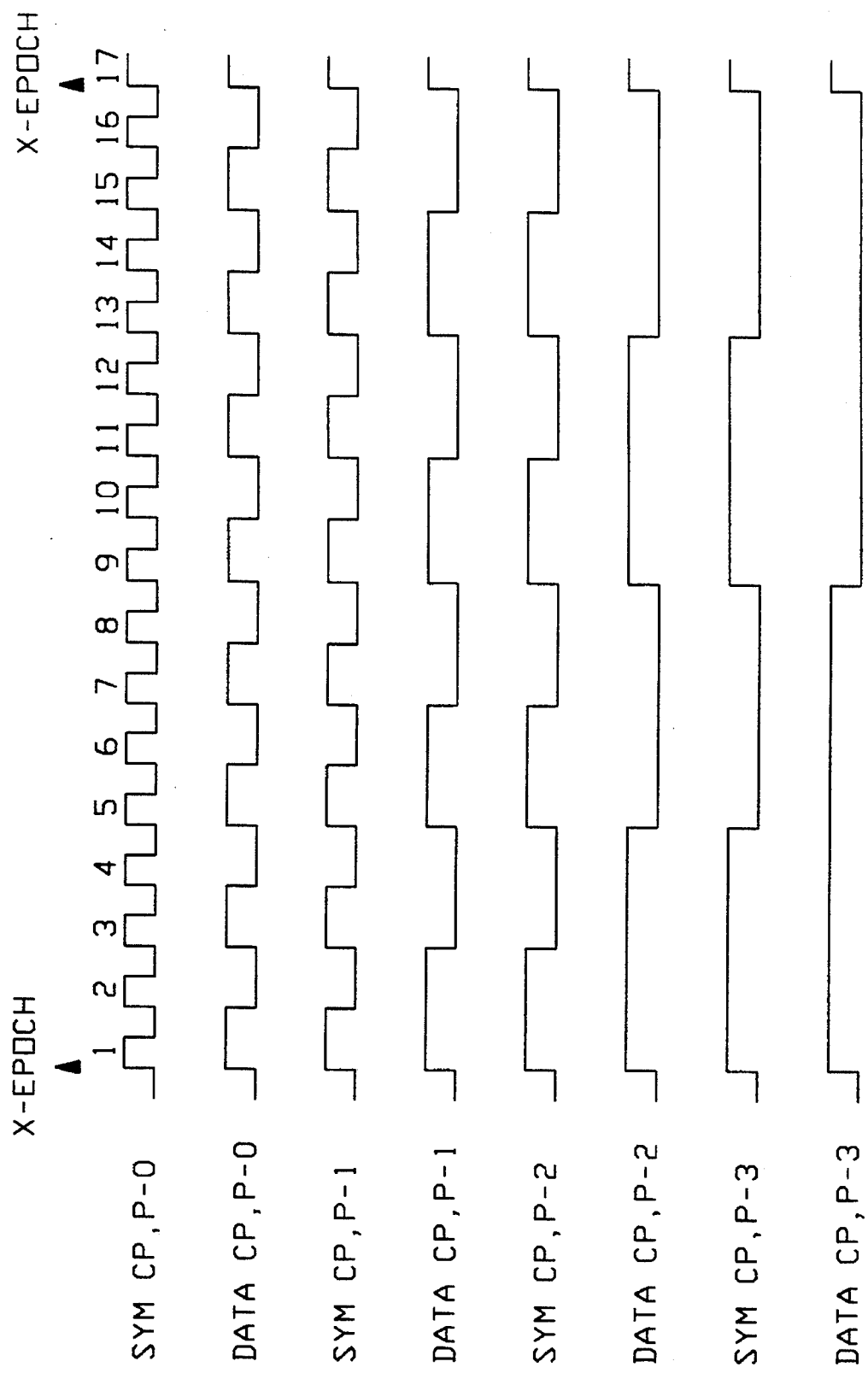
FIG. 10 is a waveform timing diagram showing signals received by, and signals generated by, the system of FIG. 1A, and the relative alignment of those signals.

FIG. 1A differs from FIG. 1 chiefly in that the I symbol timing and Q symbol timing (clocks) are synchronized by epochs of generator 12. FIG. 10 shows different possible symbol clock rates. Alternatively, such timing or synchronization could be provided from PN clock source 18 via a divider or divide-by-two component.

In FIG. 1, there is no implied relationship between PN clock and symbol clock. In FIG. 1A, the symbol clock is derived from a power of 2 division, from 1 up to the $2^N$ length of the X code. In the case of FIG. 1A, the symbol clock is synchronized to the X-epoch such that the symbol clock occurs at the X-epoch, but there may be more than one symbol clock per X-epoch, depending on the division ratio between the PN clock and the symbol clock. This is shown by FIG. 10 with the multiple symbol rates compared to the X-epochs.

Figures 2A, 3:
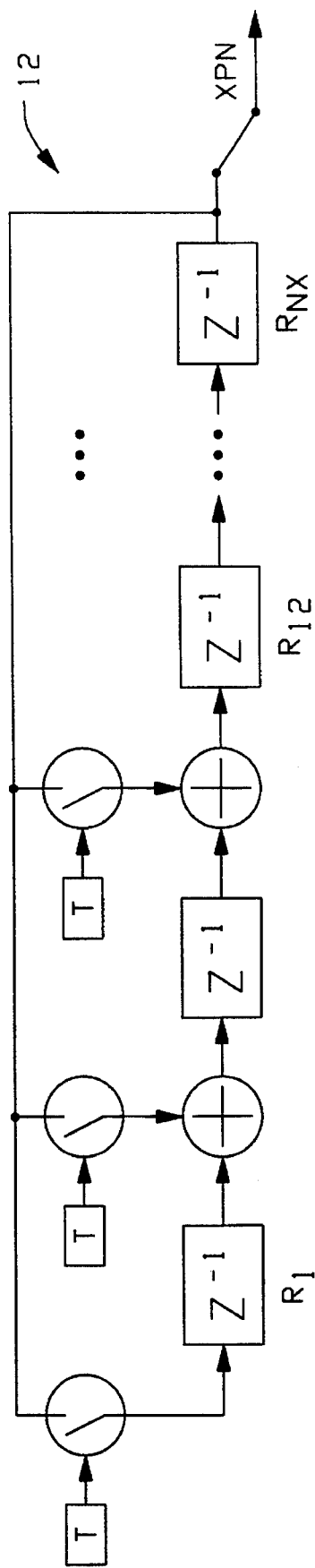

FIG. 2 and FIG. 2A each show a Venn diagram or logic map showing the preferred output PN codes to be produced by combiner 20. The map of FIG. 2 and the map of FIG. 2A each show eight separately defined areas or subregions, defined as shown in the margins of each such map. Thus, the top half of each map contains all four X subregions while the bottom half of each map contains all four not-X subregions; the left half of each map contains the four subregions that constitute the Y region while the right half of each map contains the four subregions that constitute the not-Y region; and the middle four subregions of each map constitute the Z region while the four outer subregions of each map constitute the not-Z region.

Each of the eight subregions of the map of FIG. 2 contains four mutually orthogonal pairs of Boolean values, wherein one member of such a pair is antipodal or inversely related to the other member of that pair. In each such pair, the binary number in parentheses is the inverse of the other binary number. Combining the Boolean pairs from the same corner of each subregion of FIG. 2 yields the four mutually orthogonal sets of antipodal expressions shown in Table 1 below. Each of the eight subregions shown in the map of FIG. 2 has four separate data points, defined as shown in FIG. 2. For each of the four such points in each of the eight regions of the map of FIG. 2, two antipodal (inversely related) values are defined. The first line of Table 1 below (also shown in the table of FIG. 2 below the map) shows the expressions resulting from the such antipodal data pairs for the upper left corner of each of the eight regions. The second line of Table 1 shows the antipodal expressions resulting from the antipodal pair in the upper right corner of each of the eight subregions. The antipodal expressions at the third line of Table 1 utilize the antipodal pairs at the lower right corner of each of the eight subregions. The antipodal expressions at the fourth (and last) line of Table 1 represent the antipodal pairs at the lower left corner of each of the eight subregions. Thus, in Table 1 the left-hand expression is antipodal to the right-hand expression on the same line. Also, in the left half of Table 1, the four expressions are mutually orthogonal. Similarly, the four expressions in the right half of Table 1 are also mutually orthogonal. Thus, based on FIG. 2, Table 1 defines two antipodal or inversely related groups, each of which consists of four mutually orthogonal subgroups.

TABLE 1

$$X \oplus Y \cdot Z \leftrightarrow \bar{X} \oplus Y \cdot Z$$
$$X \oplus \bar{Y} \cdot Z \leftrightarrow \bar{X} \oplus \bar{Y} \cdot Z$$
$$X \oplus Y \cdot \bar{Z} \leftrightarrow \bar{X} \oplus Y \cdot \bar{Z}$$
$$X \oplus \bar{Y} \cdot \bar{Z} \leftrightarrow \bar{X} \oplus \bar{Y} \cdot \bar{Z}$$

The resulting expression for two antipodal groups each of four mutually orthogonal subgroups is given below and at the last line of FIG. 2. In that expression, the inverted-T symbol means "mutually orthogonal to".

$$[X \oplus Y \cdot Z \perp X \oplus \bar{Y} \cdot Z \perp X \oplus Y \cdot \bar{Z} \perp X \oplus \bar{Y} \cdot \bar{Z}] \leftrightarrows [\bar{X} \oplus Y \cdot Z \perp \bar{X} \oplus \bar{Y} \cdot Z \perp \bar{X} \oplus Y \cdot \bar{Z} \perp \bar{X} \oplus \bar{Y} \cdot \bar{Z} \oplus +e, ovs\ Y \cdot Z]$$

Thus, FIG. 2 establishes that this desirable orthogonality property is present. The double-headed arrow means "antipodal to".

It is important to understand that the present invention thereby provides a plurality of expressions that are mutually orthogonal.

The Venn diagram or logic map of FIG. 2A, which is similar to that of FIG. 2, also shows that the left half and the right half of Table 1 each constitute a group of mutually orthogonal expressions. For FIG. 2A, let A=X⊕Y•Z, B=X⊕ not Y•Z, C=X⊕Y• not Z, and D=⊕ not Y• not Z. Expressions A, B, C and D correspond, in that order, to the four expressions of the left half of Table 1. One can then determine the correlation between A and B. In determining such correlation, a value of +1 indicates that A and B agree in some area or subregion, while a value of −1 indicates that A and B there do not agree. Using that information, correlation between A and B can then be determined for each of the eight subregions of FIG. 2A. For example, in subregion (1), the value of A will be 1, which will also be the value of B. These expressions therefore agree in subregion (1). To represent this, an agreement/disagreement value of +1 is assigned to subregion (1) for this purpose. In subregion (2), not A=0 while B=1, so the two expressions there disagree. Subregion (2) is therefore assigned an agreement/disagreement value of −1 for this purpose. In subregion (3), A will have a value of 1 while not B will have a value of 0, so the two expressions disagree in subregion (3). In subregion (4), A will have a value of 1, as will B; the two expressions therefore agree in subregion (4). For the eight subregions of FIG. 2A, the agreement/disagreement values will accordingly be +1, −1, −1, +1, +1, −1, −1 and +1 for subregions (1) through (8), in that order. The correlation value of A and B for FIG. 2A is equal to the total number of agreements minus the total number of disagreements, all divided by the total number of such values. Since A and B agree in four subregions and disagree in the other four subregions, the correlation value will equal 0, which is true only if the two expressions are mutually orthogonal, with no correlation. In a similar manner, it can thus be determined using FIG. 2A that expressions A, B, C and D are mutually orthogonal.

For the above example using FIG. 2A, it was assumed that each of the eight subregions was equally likely to occur, so that there is no need to individually weight the agreement/ disagreement value for any particular subregion. If this were not the case, then it can be determined that any two such expressions would be mutually orthogonal, but it would not be assured that all four such expressions would be mutually orthogonal.

As discussed above, each of the expressions in the left half of Table 1 is antipodal or inversely related to the corresponding expression on the same line of the right half of that table. Thus, two sets of these eight expressions are mutually orthogonal, while four sets of these eight expressions are antipodal.

FIG. 3 shows one embodiment of X PN code generator 12, namely a feedback shift register configuration used to generate the X-PN code. The presence of the switches T makes the X-PN code generator of FIG. 3 programmable. FIG. 3 shows a preferred shift register configuration that can be utilized as generator 14 of FIG. 1. Each block labelled $Z^{-1}$ represents a single chip (or clock) delay. T represents a programmable tap which is programmable to be either open (logically disconnected) or closed (logically connected). $R_n$ represents shift register number, with n indicating the maximum number of shift registers used in a particular version of the configuration of FIG. 3.

Figure 3A:
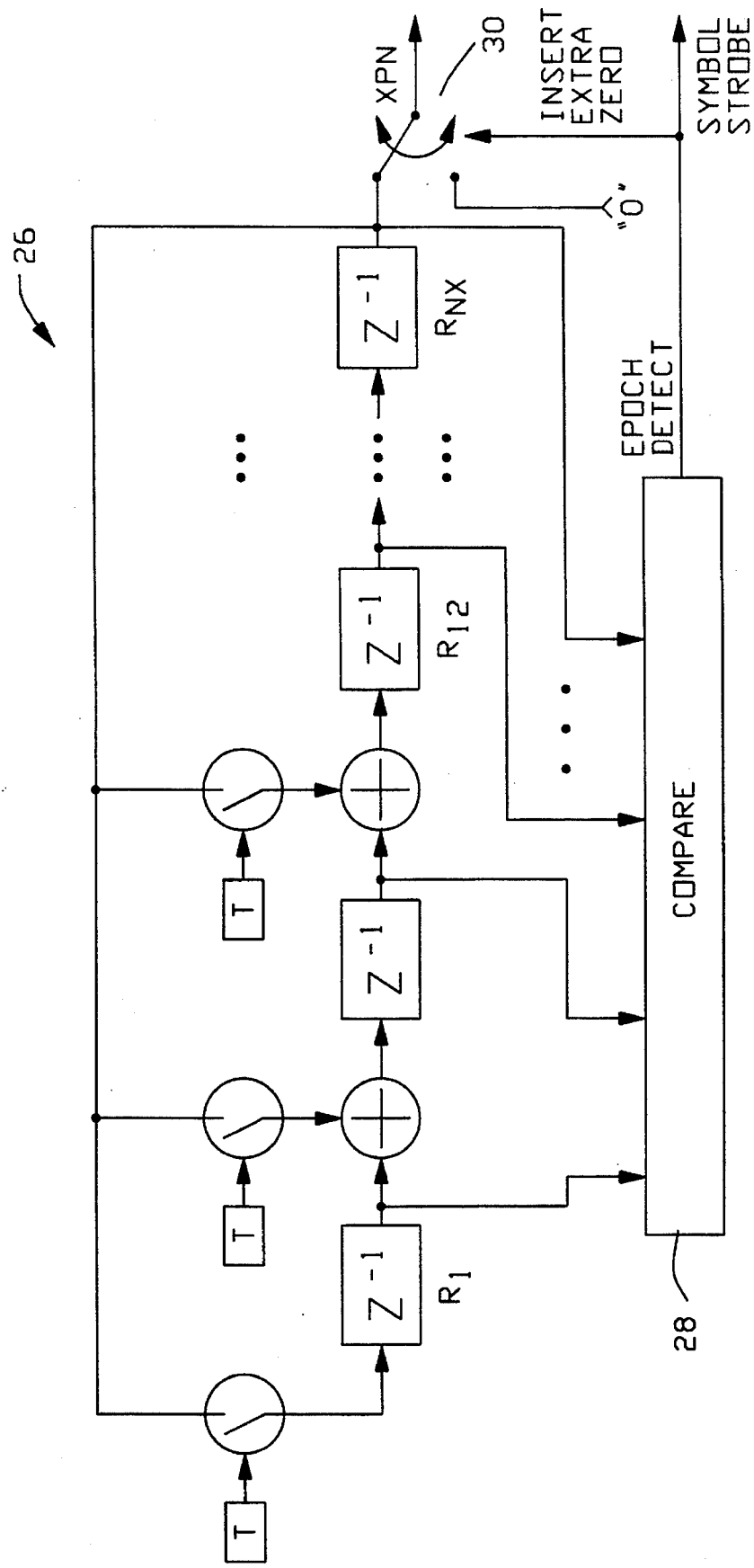
FIG. 3A is a functional block diagram of an alternative PN code generator that can be utilized as the X PN code generator in the system of FIG. 1A.

FIG. 3A shows an alternative embodiment of an X PN code generator 26 that can be so utilized in the system of FIG. 1A. $Z^{-1}$, T and $R_n$ shown in FIG. 3A have the same meaning as described above for FIG. 3. As shown in FIG. 3A, alternative generator 26 includes a feedback shift register configuration similar to that of FIG. 3A, but has a tap coming off the output of each shift register $R_i$ which is then provided to a compare circuit or comparator 28. Compare circuit 28 determines whether a major epoch (indicated by an all one's value) of the output code is present. If so, then on the output line EPOCH DETECT of compare circuit 28, an additional 0 is inserted onto the code. The EPOCH DETECT line is also used to strobe or clock in the data to data combiner 22. Alternative X-PN code generator 26, shown in FIG. 3A, is programmable to generate maximal-length PN codes having length between $2^7-1$ and $2^{16}-1$. Generator 26 is also programmable (using taps T) to generate PN codes having binary length between $2^7$ and $2^{16}$. PN codes having binary length are generated by generator 26 by appending an additional 0 bit onto each maximal length sequence of length $2^n-1$, resulting in a binary length of $2^n$. The code phase for inserting the extra 0 bit is the all one's register state of the PN code generator 26, for all registers $R_i$. If compare circuit 28 detects such a phase, it will activate switch 30 to insert the additional 0 bit immediately following the all 1's contained in registers $R_i \ldots R_n$. The resulting overall sequence thus has a balanced amount of 1's and 0's.

Figure 4:
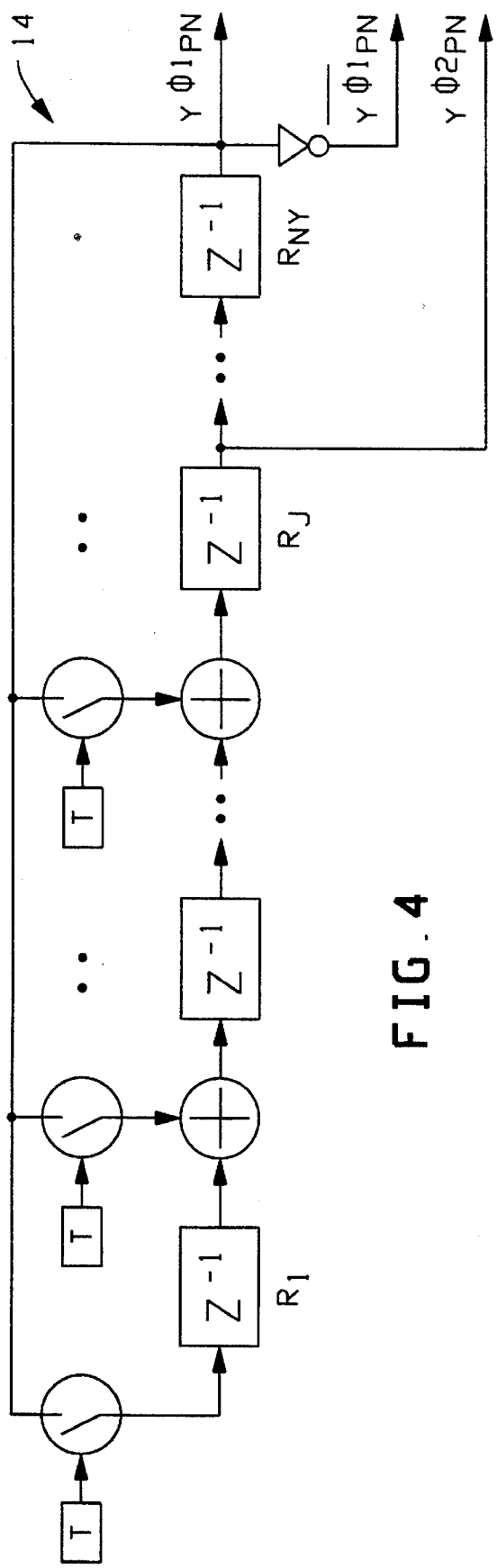
FIG. 4 is a functional block diagram of a PN code generator that can be utilized as the Y PN code generator in the system of FIG. 1 and in the system of FIG. 1A.

FIG. 4 is a functional block diagram of a preferred Y-PN code generator which can be used as generator 14 $Z^{-1}$, T and $R_n$ shown in FIG. 4 have the same meaning as described above for FIG. 3. The generator of FIG. 4 can be made fully programmable, i.e. all taps are programmable to be connected or disconnected.

Figure 5:
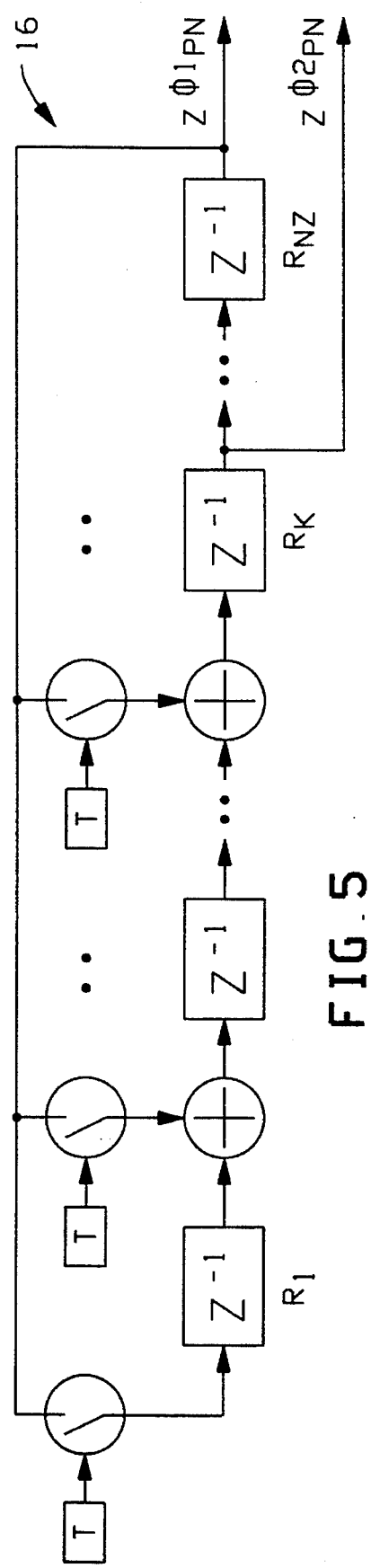
FIG. 5 is a functional block diagram of a PN code generator that can be utilized as the Z PN code generator in the system of FIG. 1 and in the system of FIG. 1A.

FIG. 5 is a functional block diagram of a preferred feedback shift register configuration that may be utilized as Z-PN code generator 16. $Z^{-1}$, T and $R_n$, in FIG. 5 have the same meaning as discussed above for FIGS. 3 and 4.

Figure 6:
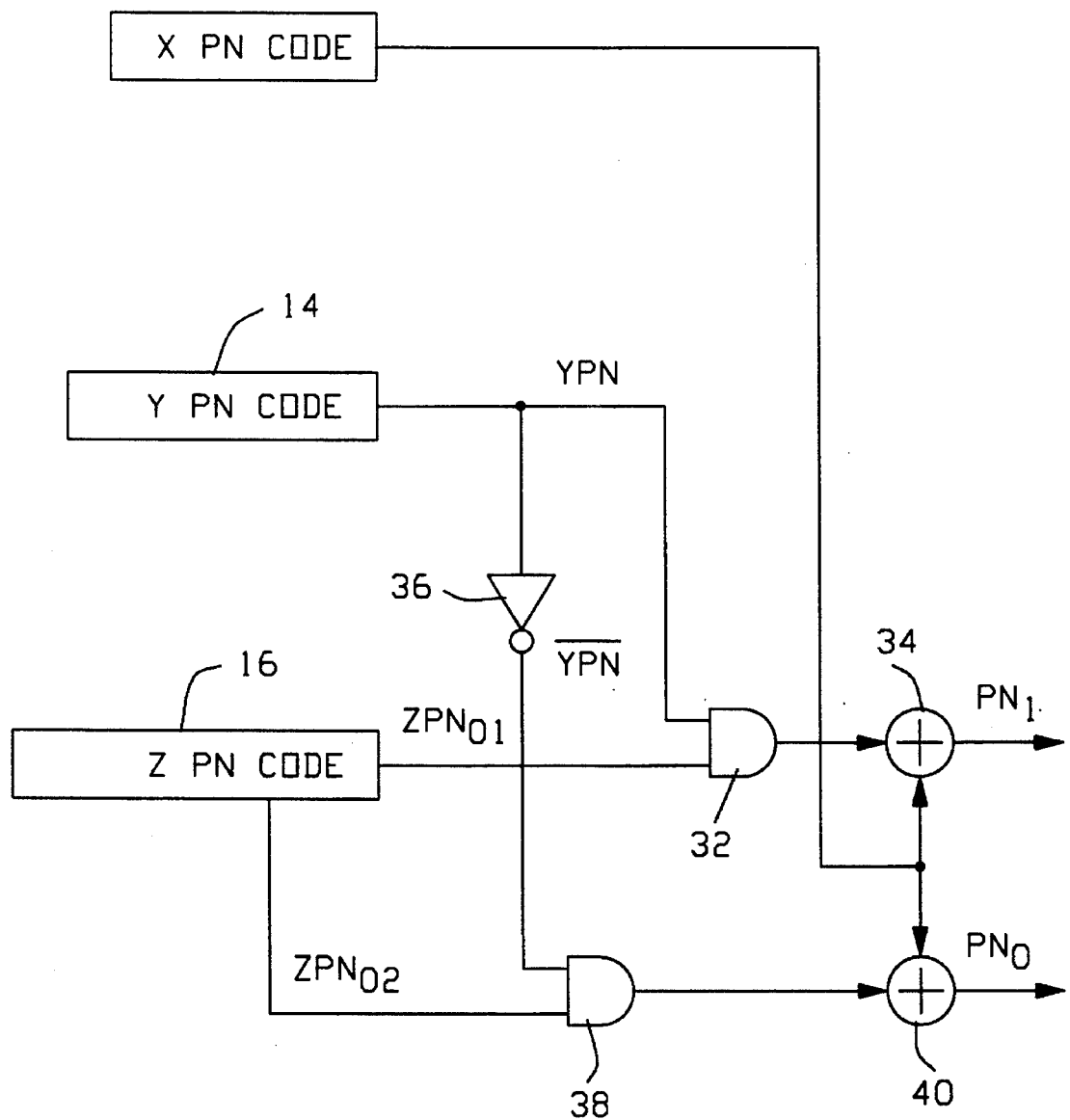
FIG. 6 is a functional block diagram showing how the respective outputs of the X PN code generator, the Y PN code generator and the Z PN code generator of FIG. 1 or of FIG. 1A can be combined to produce an I PN MAND code and a Q PN MAND code.
Figure 7:
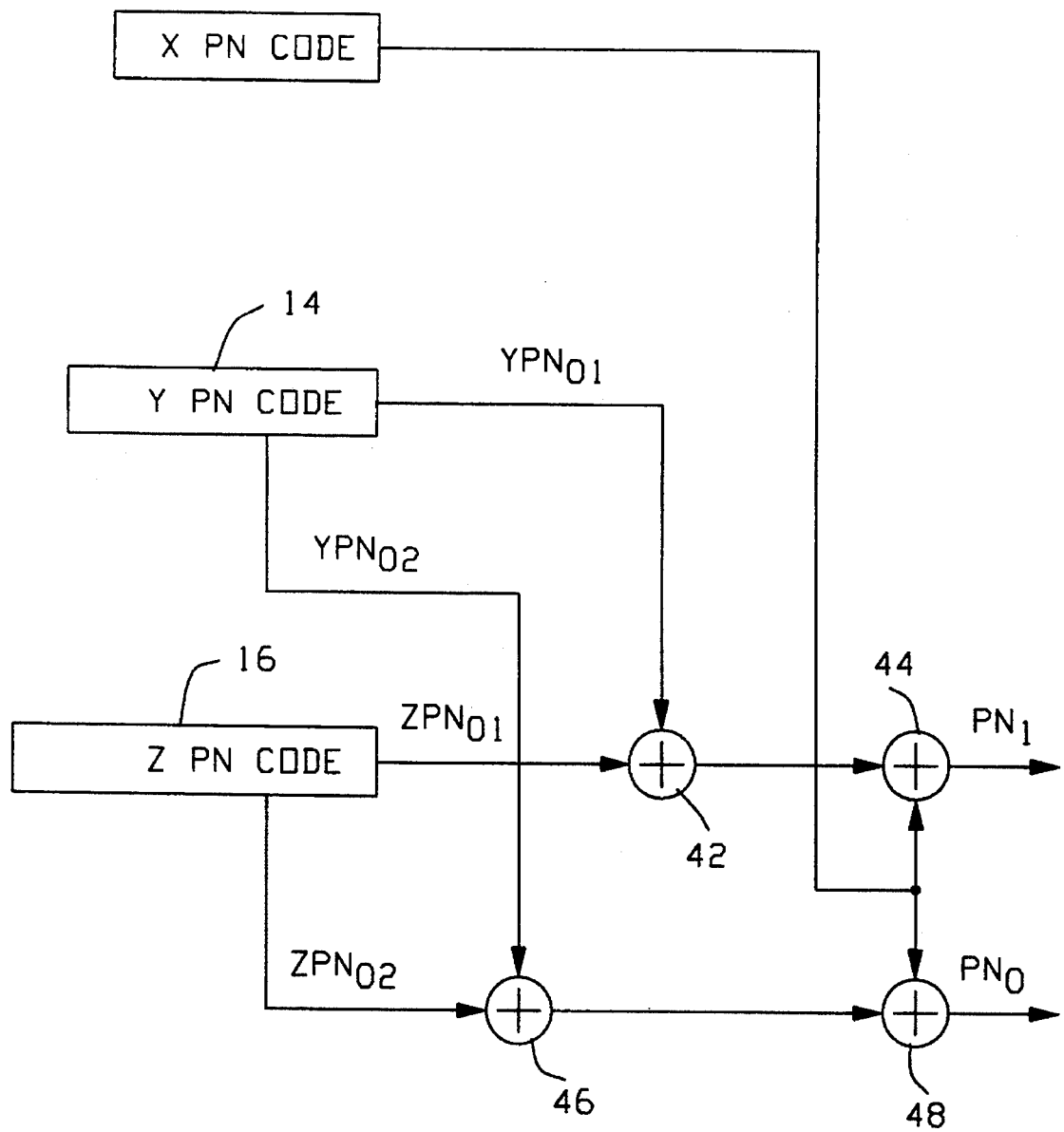
FIG. 7 is a functional block diagram showing how the respective outputs of the X PN code generator, the Y PN code generator and the Z PN code generator of FIG. 1 or of FIG. 1A can be combined to form an I PN MOD code and a Q PN MOD code.
Figure 8:
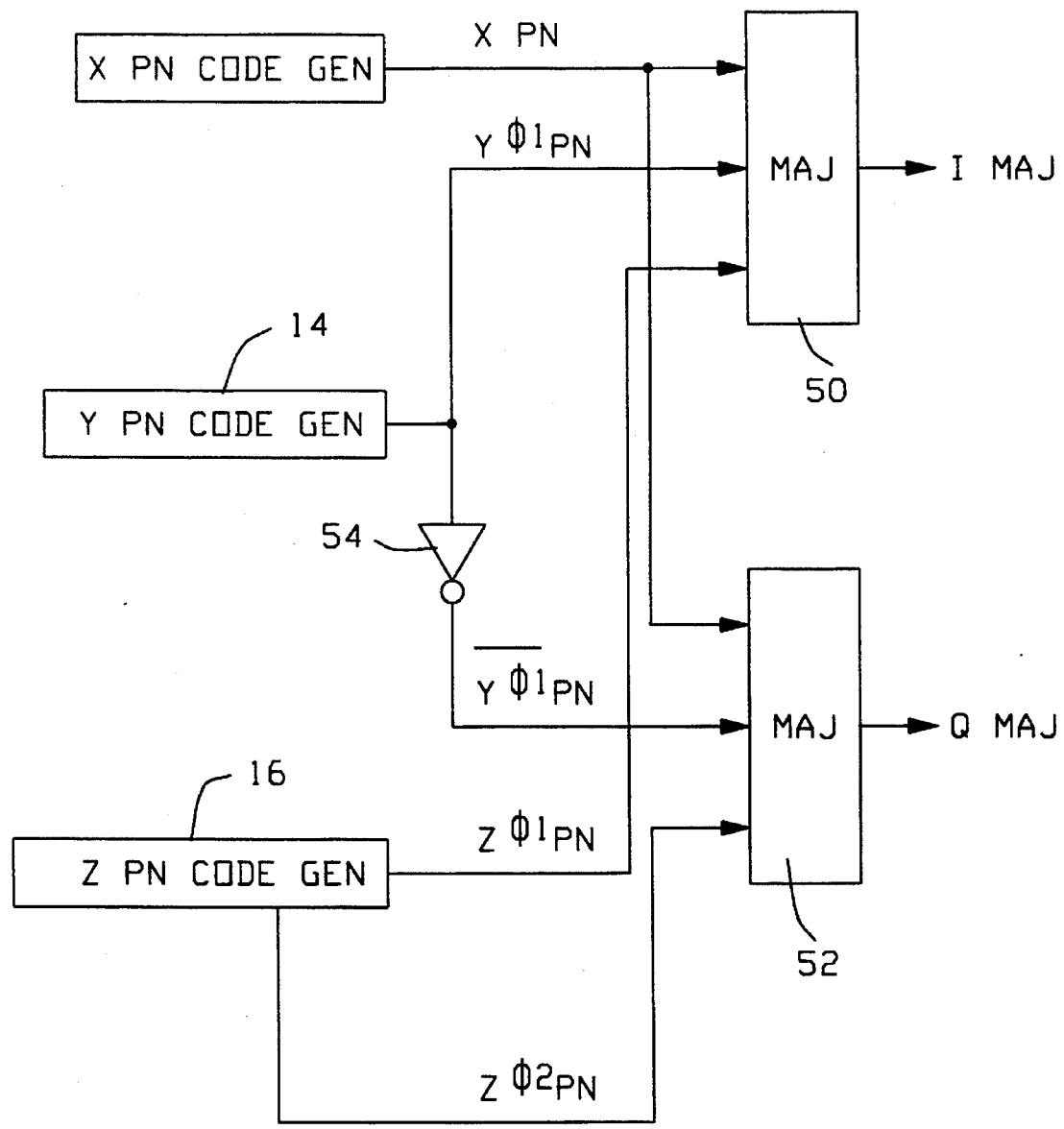
FIG. 8 is a functional block diagram showing code combining to produce an MAJ code having I and Q phases.

PN code generator and modulator 10 has the capability to generate I-PN (in-phase) and Q-PN (quadrature) codes by mathematically combining outputs from the X-, Y- and Z-code generators 12, 14 and 16 to produce the desired plurality of output PN codes. For this preferred embodiment, code combiner 20 combines the outputs of generators 12, 14 and 16 to produce MAND, MAJ and MOD PN codes, as discussed below. The codes produced by generators 12, 14 and 16 are combined as shown by FIG. 6 for the MAND PN code, as shown by FIG. 7 for the MOD PN code, and as shown by FIG. 8 for the MAJ PN code. For each of the MAND, MAJ and MOD PN codes, the Q-code is produced by combining the same X, Y and Z output sequences respectively from generators 12, 14 and 16 in the same manner as the I code is combined, except that when producing the MAND and MAJ codes, the not-Y code is substituted for the Y code and a different phase of the Z code is used. In forming the MOD codes, a different phase of the Y code and the Z code is used for producing the Q code than is used for producing the I code. However, the X code used is identical for both the I code and the Q code for each of the MAND, MAJ and MOD PN codes. The I and Q codes are mutually orthogonal and each have the correlation properties as summarized by Table 2 below.

TABLE 2

| Correlation of component codes with the MAND/MOD codes | | | |
|---|---|---|---|
| CODE | | CORRELATION | CORRELATION |
| Reference | Logic | WITH MOD | WITH MAND |
| MAND | X⊕ (Y·Z) | −0.5 | 1.0 |
| X | X | 0 | 0.5 |
|  | Y ⊕ Z | 0 | 0.5 |
|  | X ⊕ Z | 0 | 0.5 |
| MOD | X⊕Y⊕Z | 1.0 | −0.5 |
| Y | Y | 0 | 0 |
| Z | Z | 0 | 0 |

Although any number of composite sequences, and any composite sequences, can be produced by the system of FIG. 1, three composite sequences are produced, namely a MOD PN code, a MAND PN code, and a MAJ PN code. Each of these three composite sequences are each composed of three component codes referred to above as the X PN code, the Y PN code and Z PN code. However, for this embodiment, an additional requirement was imposed in that the X code was required to have the same phase for both the I code and the Q code. For this reason, a second phase of the X code was not available when attempting to produce an orthogonal pair from the X, Y and Z code generators 12–16.

The outputs of the X, Y and Z-PN code generators 12–16 are combined to generate the MAND PN code, the MAJ PN code and the MOD PN code. However, a problem arises when trying to produce an orthogonal pair for the MAND and MAJ sequences. Since for this example the same X code is to be used for both I and Q sequences in the orthogonal pair, using different phases of the Y and Z codes to produce the MAND and MAJ sequences would result in a pair of codes that are correlated. This problem is addressed below.

The MAND code, which is defined as MAND (X,Y,Z)= X⊕(Y·Z), is generated by ANDing the Y code and the Z code to form the composite Y·Z code, and then modulo-2 combining that composite code with the X code. This processing can be accomplished with the structure shown in FIG. 6. A correlated pair of sequences will result if the MAND I and Q code pairs are produced by only changing the phase of the Y and Z codes while using the same phase of the X code for both the I and Q output codes. However, it is preferred to produce an uncorrelated pair (I and Q) of sequences. As shown in FIG. 6, an uncorrelated pair of sequences can be produced by inverting the Y code and tapping a second phase of the Z code to produce the second (Q) code. This produces the sequences:

$$\text{I-MAND} = X \oplus (Y^{\phi 1} \cdot Z^{\phi 1})$$

$$\text{Q-MAND} = X \oplus (\bar{Y} \cdot Z^{\phi 2})$$

In FIG. 6, the respective outputs of the X PN code generator 12 (or 26), the Y PN code generator 14 and the Z PN code generator 16 are utilized. The Y code and the Z code are ANDed by gate 32, whose output is then exclusive-ORed with the X code by gate 34. The output of exclusive OR ($\oplus$ or EXOR) gate 34 produces the I MAND PN code. The Y code is also inverted by inverter 36, and the resulting not-Y code is then ANDed with the Z code by gate 38. The output of AND gate 38 is then exclusive-ORed with the output of X PN code generator 12 (or 26) by exclusive OR gate 40 to produce the Q MAND PN code, as shown in FIG. 6.

Figure 9:
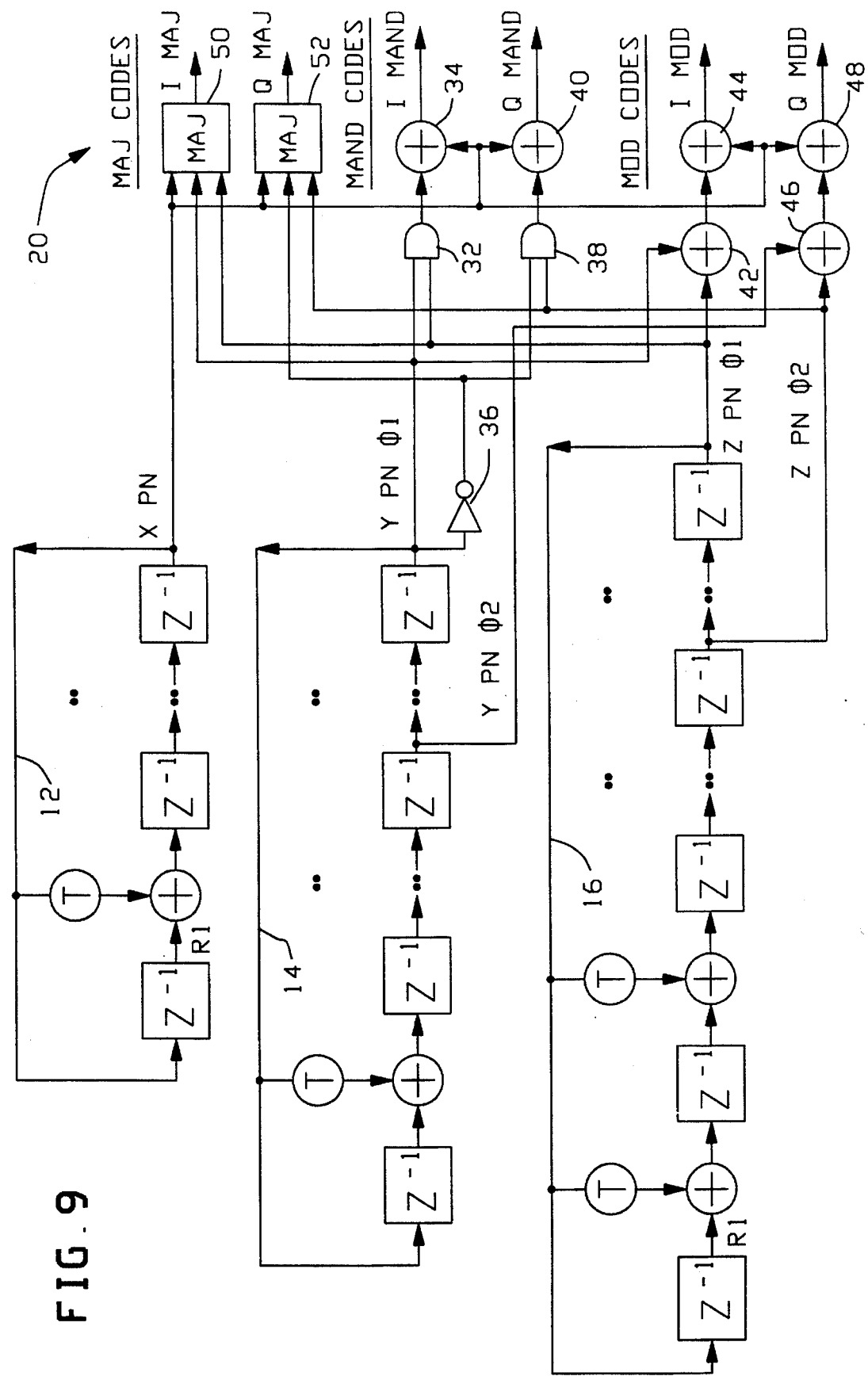
FIG. 9 is a block diagram of the system of FIG. 1 shown in greater detail, showing PN code generation and code combining logic for producing MAJ, MAND and MOD codes according to the present invention.

The MOD code is produced by modulo-2 combining the X, Y and Z sequences to get a much longer PN code. The MOD code is defined as MOD (X, Y, Z)=$X \oplus Y \oplus Z$. The MOD code exhibits the correlation properties tabulated in Table 2 when correlated with the component codes. Code combining of the X PN code, Y PN code and Z PN code to form the MOD I-PN code and the MOD Q-PN code is illustrated in FIG. 7. Producing an orthogonal code pair for this composite sequence is accomplished as follows. The second composite code is produced tapping off a second phase of the shift registers for both the Y and Z codes, as shown in FIGS. 7 and 9. If the X, Y and Z component codes are maximal length sequences, and their lengths are relatively prime, then the resulting combined sequence will be a second phase of the original sequence with a very large phase offset. If the component sequences are very long, then the phase offset of the second composite sequence from the first is guaranteed to be very large. The resulting pair of codes is therefore uncorrelated over any reasonable phase offset, and are functionally orthogonal. The resulting sequences are:

$$\text{I-MOD} = X \oplus Y^{\phi 1} \oplus Z^{\phi 1}$$

$$\text{Q-MOD} = X \oplus Y^{\phi 2} \oplus Z^{\phi 2}$$

FIG. 7 shows how the X, Y and Z PN codes are combined to produce the MOD (modulo two addition combining rule) code. The Y code produced by generator 14, and the Z code produced by generator 16, are exclusive-ORed by gate 42. The output of exclusive-OR gate 42 is then exclusive-ORed with the X output of code generator 12 by gate 44 to produce the MOD I PN code. To produce the MOD Q PN code, the first tap shown from the generator of FIG. 4, and the one tap shown from the generator of FIG. 5, are exclusive-ORed by gate 46. The output of exclusive-OR gate 46 is then exclusive-ORed by gate 48 with the X output of generator 12 (or 26) to produce the MOD Q PN code.

The MAJ (majority vote) code is generated by taking a majority vote of the X, Y and Z codes, using majority determining or majority vote components 50 and 52, as shown in FIG. 8. FIG. 8 shows how the component codes are combined to produce the MAJ code. As with the generation of the MAND code, in FIG. 8 a correlated pair of sequences results by only changing the phase of the Y and Z codes and using the same phase of the X code for both the I and Q MAJ codes. To obtain the desirable orthogonality property, in FIG. 8 an uncorrelated pair of MAJ sequences are produced by inverting the Y code and tapping a second phase of the Z code, to produce the second (Q) code. The following sequences result:

$$\text{I-MAJ} = \text{MAJ}(X, Y^{\phi 1}, Z^{\phi 1})$$

$$\text{Q-MAJ} = \text{MAJ}(X, \bar{Y}, Z^{\phi 2})$$

The MAJ function can also be expressed as a logic equation for completeness:

$$\text{I-MAJ} = (X \cdot Y^{\phi 1}) + (X \cdot Z^{\phi 1}) + (Y^{\phi 1} \cdot Z^{\phi 1})$$

$$\text{Q-MAJ} = (X \cdot \bar{Y}) + (X \cdot Z^{\phi 2}) + (\bar{Y} \cdot Z^{\phi 2})$$

or $$\text{MAJ}(A, B, C) = (A \cdot B) + (A \cdot C) + (B \cdot C)$$

where • means AND and + means OR.

Each majority vote combiner 50 and 52 has three inputs, and its output reflects a majority vote of those three inputs. In FIG. 8, for majority vote combiner 50, those three inputs are the X code from generator 12 (or 26), the Y code from generator 14 and the Z code from generator 16, and the output is the I MAJ PN code. For majority vote combiner 52, the three inputs are the X code from generator 12, the inverse of the Y code from generator 14 and the output of the tap shown in FIG. 5. Majority vote combiner 52 produces the Q MAJ PN code.

FIG. 9 in part is a block diagram of code combining logic for producing the three (MAND, MOD and MAJ) types of output codes. FIG. 9 is a more detailed block diagram of a portion of the system of FIG. 1, showing an embodiment for each of generator 12, generator 14 and generator 16, and circuitry that can be utilized as code combiner 20. This additional detail also partially appears in FIG. 3 (for generator 12), FIG. 4 (for generator 14), FIG. 5 (for generator 16), and FIGS. 6–8 (for combiner 20). Accordingly, operation of the various components of FIG. 9 is as described above regarding the operation of FIGS. 3–8.

The I and Q data (or data symbols) are combined with the I-PN and Q-PN codes by data combiner 22 by modulo-2 combining the respective I or Q data with the corresponding I or Q PN codes. Timing or clocks for the I and Q data can be provided separately, or (as discussed above) can be separately or commonly derived from the output of PN clock source 18 (such as in the manner shown in FIG. 1A), or can be independently generated, or can be produced by the X-PN code generator such as in the manner shown in FIG. 3A. For the approach of FIG. 3A, the X-code major epoch is aligned with the data symbols in the manner shown in FIG. 10, which shows alignment of the X-code epoch with the symbol clock.

As discussed above, three types of codes are produced by code combiner 20. The MAND code is used during signal acquisition because of its partial correlation properties. The MOD code is used when the data link is in normal track. The MAND code has partial correlation characteristics which allow the phase of the three produced codes to be acquired independently during signal acquisition. The MAJ code also has special properties. As shown in FIGS. 1 and 9, these three types of codes are preferably produced using the same component code generating hardware, but combining the component codes differently to produce the different output codes needed.

A system which uses QPSK spreading needs orthogonal codes for the I and Q channels. The MOD I and MOD Q codes are also produced from the same component code hardware 12, 14 and 16. The MOD I code is $X \oplus Y \oplus Z$. The MOD I code is produced by combining a second phase of both the Y code and the Z code, the $Y^{\phi 2}$ and $Z^{\phi 2}$ resulting in the MOD I code being $X \oplus Y^{\phi 2} \oplus Z^{\phi 2}$. Using the second phase of the Z code to form the MOD Q code is desirable as providing a greater phase offset between the MOD I code and the MOD Q code. The I MOD and the Q MOD codes are identical except that they have a very large phase offset, making them orthogonal.

As shown in FIGS. 6, 8 and 9, the I and Q MAND codes and the I and Q MAJ codes are produced from the same component code generating hardware by producing the I code with $X \oplus (Y \cdot Z)$ and producing the Q code by inverting the Y code to get the not-Y code and tapping off a second phase of the Z code, called $Z^{\phi 2}$, to get $X \oplus (\overline{Y} \cdot Z^{\phi 2})$. This results in I and Q codes that have no cross correlation for any of the MAND, MAJ or MOD codes. This is demonstrated in examples below.

As discussed above, the MAND and MOD codes may be used for acquisition. To produce the MAND code with the desired features, a composite code is produced from three component codes, the X, Y and Z codes. The Y and Z codes are ANDed together to get an imbalanced code with ¼ ones and ¾ zeros resulting in a 50% DC offset. The X code is modulo-2 combined with this Y•Z. For one application, it is desired that the X code have a power of $^2$ length such that the full length of the sequence, as well as power of two divisions of the sequence, can be used to generate symbol timing epochs for the various data rates. The X code for that application is therefore not a maximal length sequence, which results in small partial correlation peaks throughout all phases of the sequence. If a correlation peak is found during acquisition of the X code, then an additional search is performed to verify that it is the correct code phase rather than a false lock point. This search requires two sets of X code generators in the receiver so that while one such generator is tracking the initial correlation peak, the second generator can be used to search the remaining code phase for alternative correlation peaks. If a separate X code were used for producing the I and Q codes, then the receiver would need a total of four X code generators, which would be a substantial hardware impact. Also, the various apparatuses and methods by which the X code is generated in these embodiments (see FIG. 3 and FIG. 3A) makes it difficult to obtain an additional phase by simply tapping a second position in the shift register. It is therefore desirable to use the same X code on both the I and Q channel, to simplify the hardware needed. To further simplify hardware requirements, the same hardware is used to produce both the I and Q codes for the Y and Z components also. To produce an I MOD code and a Q MOD code from the same hardware, a second phase is tapped off of the respective shift registers of FIGS. 4 and 5 respectively for the Y and Z codes. The phase offset of the combined code is therefore relatively quite large, which eliminates any exploitability which may otherwise result from using the same code on both quadratures.

In FIGS. 6 and 9, the I and Q MAND code is produced by using a different phase of the Z code combined with an inverted version of the same Y code, rather than a second phase. The same X code is there used on the I and Q codes as with the MOD code. This scheme eliminates correlation between the I and Q channels when the MAND code is used. The I and Q codes must have low cross correlation, to maintain true QPSK and avoid susceptibility to a squaring interceptor. With our MAND code, the Y•Z has a 50% DC offset to allow a partial correlation of X codes during acquisition. Since for this example the same X code is used on I and Q, independent Y and Z codes results in a −6 dB correlation between the I and Q codes, thereby making the waveform susceptible to detection by a square law detector. This is illustrated by the sequences below. Note that these codes are short random sequences to illustrate the point only, so the correlation values are not exactly the same proportion as a longer properly designed sequence. The X, Y, and Z codes are assumed to be as follows:

| X | 1001 | 1100 | 0110 | 1110 | 0100 | 1001 | 0101 | 1010 |
|---|------|------|------|------|------|------|------|------|
| Y | 1000 | 0101 | 0111 | 0010 | 0011 | 1101 | 0011 | 0101 |
| Z | 1100 | 0101 | 1110 | 0101 | 0001 | 1000 | 1100 | 1011 |

The Y•Z code then is:

| Y•Z | 1000 | 0101 | 0110 | 0000 | 0001 | 1000 | 0000 | 0001 |
|-----|------|------|------|------|------|------|------|------|

Note the 50% DC offset of the Y•Z code since ¾ of all bits are 0. If two new codes or two additional phases of the Y and Z codes are used, we represent these sequences as V and W:

| V | 1100 | 1011 | 1001 | 0101 | 1001 | 1100 | 0110 | 0010 |
|---|------|------|------|------|------|------|------|------|
| W | 1110 | 0110 | 1000 | 1011 | 0010 | 1001 | 1100 | 0010 |
| V•W | 1100 | 0010 | 1000 | 0001 | 0000 | 1000 | 0100 | 0010 |

The V and W codes are independent sequences for this example. They can represent either two new codes independent of the Y and Z codes, or different phases of the Y and Z codes. Since the offset of the second phase is large, the second phase of the Y or Z codes will appear as independent sequences when viewing a small portion of the codes.

The correlation of Y•Z and V•W is shown below. The X code is left off since for this example it is the same on both sequences and will therefore not change the correlation:

| Y•Z | 1000 | 0101 | 0110 | 0000 | 0001 | 1000 | 0000 | 0001 |
|-----|------|------|------|------|------|------|------|------|
| V•W | 1100 | 0010 | 1000 | 0001 | 0000 | 1000 | 0100 | 0010 |

This results in a net correlation of 8 of 32 chips or shift register modules, resulting in correlation between the I and Q channels. The next example is similar except that only one of the codes uses a different phase. In this case the same Y code is used, but a second phase of the Z code is used:

| $Z^{\phi 2}$ | 1100 | 0101 | 1000 | 1010 | 1100 | 0111 | 1010 | 1100 |
|--------------|------|------|------|------|------|------|------|------|

Resulting in the following sequences:

| Y | 1000 | 0101 | 0111 | 0010 | 0011 | 1101 | 0011 | 0101 |
|---|------|------|------|------|------|------|------|------|
| $Z^{\phi 2}$ | 1100 | 0101 | 1000 | 1010 | 1100 | 0111 | 1010 | 1100 |
| Y•$Z^{\phi 2}$ | 1000 | 0101 | 0000 | 0010 | 0000 | 0101 | 0010 | 0100 |

The correlation is:

| Y•Z | 1000 | 0101 | 0110 | 0000 | 0001 | 1000 | 0000 | 0001 |
|-----|------|------|------|------|------|------|------|------|
| Y•$Z^{\phi 2}$ | 1000 | 0101 | 0000 | 0010 | 0000 | 0101 | 0010 | 0100 |

The correlation between I and Q codes in this case is a net 12 of 32 chips or shift register modules, which would also result in an undesirable correlation between I and Q. In fact when one of the codes is the same, as in the above example the correlation is slightly higher than when both codes are independent. Therefore when constructing a MAND sequence in the above described manner, if independent Y and Z codes or different phases of the same Y and Z codes are used to produce the I and Q code pairs, it will result in an undesirable correlation between the I and Q channels.

The use of the Y code and the $\overline{Y}$ (inverse Y) code produce a pair of MAND codes that have zero cross correlation. This is illustrated by the example sequences below.
Given the Y code and the inverse Y code:

| Y | 1000 | 0101 | 0111 | 0010 | 0011 | 1101 | 0011 | 0101 |
|---|------|------|------|------|------|------|------|------|
| $\overline{Y}$ | 0111 | 1010 | 1000 | 1101 | 1100 | 0010 | 1100 | 1010 |

Resulting MAND sequence:

| $\overline{Y}$ | 0111 | 1010 | 1000 | 1101 | 1100 | 0010 | 1100 | 1010 |
|---|------|------|------|------|------|------|------|------|
| Z | 1100 | 0101 | 1110 | 0101 | 0001 | 1000 | 1100 | 1011 |
| $\overline{Y}\cdot Z$ | 0100 | 0000 | 1000 | 0101 | 0000 | 0000 | 1100 | 1010 |

If we correlate these two sequences:

| Y·Z | 1000 | 0101 | 0110 | 0000 | 0001 | 1000 | 0000 | 0001 |
|---|------|------|------|------|------|------|------|------|
| $\overline{Y}\cdot Z$ | 0100 | 0000 | 1000 | 0101 | 0000 | 0000 | 1100 | 1010 |

The resulting correlation is 0. The result will be the same when the X code is added to both I and Q. If we use the same scheme and substitute the $Z^{\phi 2}$ code for the Z code:

| $\overline{Y}$ | 0111 | 1010 | 1000 | 1101 | 1100 | 0010 | 1100 | 1010 |
|---|------|------|------|------|------|------|------|------|
| $Z^{\phi 2}$ | 1100 | 0101 | 1000 | 1010 | 1100 | 0111 | 1010 | 1100 |
| $\overline{Y}\cdot Z^{\phi 2}$ | 0100 | 0000 | 1000 | 1000 | 1100 | 0010 | 1000 | 1000 |
| Y·Z | 1000 | 0101 | 0110 | 0000 | 0001 | 1000 | 0000 | 0001 |
| $\overline{Y}\cdot Z^{\phi 2}$ | 0100 | 0000 | 1000 | 1000 | 1100 | 0010 | 1000 | 1000 |

The resulting correlation is also 0. Therefore the use of the Y and $\overline{Y}$ codes in our above scheme will produce orthogonal I and Q MAND codes.

The MAJ code is produced using the same component codes as were used to produce the MAND code. The example for producing a MAJ code is similar to the above example for producing a MAND code and is therefore not included here.

Producing the I and Q MOD codes for this example uses a second phase of the Y code rather than the $\overline{Y}$ code, and a second phase of the Z code, as does producing the MAND code. This is because, with the MOD codes, an inverted component code will not change the characteristics of the composite code. An inverted sequence will only result in a composite code that is inverted. This is shown below. Furthermore, if any of the component codes are the same between the I and Q MOD codes, then that component code can be cancelled by multiplying the I and Q sequences. This would result in an effectively shorter composite code to an intercept receiver.

If the same component codes are used to produce the I and Q MOD codes as used in the I and Q MAND codes, the resulting composite I and Q codes are simply inverses of each other:

| Y | 1000 | 0101 | 0111 | 0010 | 0011 | 1101 | 0011 | 0101 |
|---|------|------|------|------|------|------|------|------|
| Z | 1100 | 0101 | 1110 | 0101 | 0001 | 1000 | 1100 | 1011 |
| Y⊕Z | 0100 | 0000 | 1001 | 0111 | 0010 | 0101 | 1111 | 1110 |
| $\overline{Y}$ | 0111 | 1010 | 1000 | 1101 | 1100 | 0010 | 1100 | 1010 |
| Z | 1100 | 0101 | 1110 | 0101 | 0001 | 1000 | 1100 | 1011 |
| $\overline{Y}$⊕Z | 1011 | 1111 | 0110 | 1000 | 1101 | 1010 | 0000 | 0001 |

$$Y \oplus Z = \overline{(\overline{Y} \oplus Z)}$$

The use of a second phase of both the Y and Z codes to produce the I and Q MOD pair will result in orthogonal MOD codes on the I and Q channels. The I and Q composite codes will have a very large phase offset and will appear independent to an intercept receiver.

Examples of the I and Q MOD codes are shown below:
The I MOD code:

| Y | 1000 | 0101 | 0111 | 0010 | 0011 | 1101 | 0011 | 0101 |
|---|------|------|------|------|------|------|------|------|
| Z | 1100 | 0101 | 1110 | 0101 | 0001 | 1000 | 1100 | 1011 |
| Y⊕Z | 0100 | 0000 | 1001 | 0111 | 0010 | 0101 | 1111 | 1110 |
| X | 1001 | 1100 | 0110 | 1110 | 0100 | 1001 | 0101 | 1010 |
| X⊕Y⊕Z | 1101 | 1100 | 1111 | 1001 | 0110 | 1100 | 1010 | 0100 |

The Q MOD code:

| $Y^{\phi 2}$ | 0100 | 1110 | 1001 | 0110 | 0100 | 1011 | 0011 | 1001 |
|---|------|------|------|------|------|------|------|------|
| $Z^{\phi 2}$ | 1100 | 0101 | 1000 | 1010 | 1100 | 0111 | 1010 | 1100 |
| $Y^{\phi 2}\oplus Z^{\phi 2}$ | 1000 | 1011 | 0001 | 1100 | 1000 | 1100 | 1001 | 0101 |
| X | 1001 | 1100 | 0110 | 1110 | 0100 | 1001 | 0101 | 1010 |
| $X\oplus Y^{\phi 2}\oplus Z^{\phi 2}$ | 0001 | 0111 | 0111 | 0010 | 1100 | 0101 | 1100 | 1111 |

Correlation of the I and Q MOD code:

| X ⊕ Y ⊕ Z | 1101 | 1100 | 1111 | 1001 | 0110 | 1100 | 1010 | 0100 |
|---|------|------|------|------|------|------|------|------|
| $X\oplus Y^{\phi 2}\oplus Z^{\phi 2}$ | 0001 | 0111 | 0111 | 0010 | 1100 | 0101 | 1100 | 1111 |

The correlation is approximately 0, the slight correlation of 4 chips is because of the short made up sequences.
Correlation of X with MOD:

| X⊕Y⊕Z | 1101 | 1100 | 1111 | 1001 | 0110 | 1100 | 1010 | 0100 |
|---|------|------|------|------|------|------|------|------|
| X | 1001 | 1100 | 0110 | 1110 | 0100 | 1001 | 0101 | 1010 |

0 correlation, showing orthogonality.

The MAND Q and MAJ Q codes can be formed without using the second phase of Z, but then the inverse of Y is needed for both of those codes.

Example sequences are used below to illustrate the preferred method of combining the codes. The illustrative codes shown below are only very short random sequences to illustrate operation of that method, so the resulting correlation values are not exactly the same proportion as a longer properly designed sequence. As given above, the X, Y and Z codes for this example are as follows:

| X | 1001 | 1100 | 0110 | 1110 | 0100 | 1001 | 0101 | 1010 |
|---|------|------|------|------|------|------|------|------|
| Y | 1000 | 0101 | 0111 | 0010 | 0011 | 1101 | 0011 | 0101 |
| Z | 1100 | 0101 | 1110 | 0101 | 0001 | 1000 | 1100 | 1011 |

Example of the MAND Codes:
The I MAND code:

| $\overline{Y}$ | 1000 | 0101 | 0111 | 0010 | 0011 | 1101 | 0011 | 0101 |
|---|------|------|------|------|------|------|------|------|
| Z | 1100 | 0101 | 1110 | 0101 | 0001 | 1000 | 1100 | 1011 |
| $\overline{Y}\cdot Z$ | 1000 | 0101 | 0110 | 0000 | 0001 | 1000 | 0000 | 0001 |
| X | 1001 | 1100 | 0110 | 1110 | 0100 | 1001 | 0101 | 1010 |
| $X\oplus(\overline{Y}\cdot Z)$ | 0001 | 1001 | 0000 | 1110 | 0101 | 0001 | 0101 | 1011 |

The Q MAND code:

| $\overline{Y}$ | 0111 1010 1000 1101 1100 0010 1100 1010 |
|---|---|
| $Z^{\phi 2}$ | 1100 0101 1000 1010 1100 0111 1010 1100 |
| $\overline{Y}\cdot Z^{\phi 2}$ | 0100 0000 1000 1000 1100 0010 1000 1000 |
| X | 1001 1100 0110 1110 0100 1001 0101 1010 |
| $X\oplus(\overline{Y}\cdot Z^{\phi 2})$ | 1101 1100 1110 0110 1000 1011 1101 0010 |

The correlation of I MAND code and Q MAND code:

| | |
|---|---|
| $X \oplus (Y \cdot Z)$ | 0001 1001 0000 1110 0101 0001 0101 1011 |
| $X \oplus (\bar{Y} \cdot Z^{\phi 2})$ | 1101 1100 1110 0110 1000 1011 1101 0010 |

The correlation is 0, showing orthogonality.
Correlation of X with MAND:

| | |
|---|---|
| $X \oplus (Y \cdot Z)$ | 0001 1001 0000 1110 0101 0001 0101 1011 |
| X | 1001 1100 0110 1110 0100 1001 0101 1010 |

Correlation is net 16/32, high.
Correlation of Y with MAND:

| | |
|---|---|
| $X \oplus (Y \cdot Z)$ | 0001 1001 0000 1110 0101 0001 0101 1011 |
| Y | 1000 0101 0111 0010 0011 1101 0011 0101 |

Correlation is close to 0.
Correlation of $X \oplus Y$ with MAND:

| | |
|---|---|
| X | 1001 1100 0110 1110 0100 1001 0101 1010 |
| Y | 1000 0101 0111 0010 0011 1101 0011 0101 |
| $X \oplus Y$ | 0001 1001 0001 1100 0111 0100 0110 1111 |
| $X \oplus (Y \cdot Z)$ | 0001 1001 0000 1110 0101 0001 0101 1011 |

Correlation is 16/32, high.
Example of the MAJ Codes:

The MAJ code is produced from a majority vote of the three component codes.

| | |
|---|---|
| X | 1001 1100 0110 1110 0100 1001 0101 1010 |
| Y | 1000 0101 0111 0010 0011 1101 0011 0101 |
| Z | 1100 0101 1110 0101 0001 1000 1100 1011 |
| MAJ | 1000 0101 0110 0110 0001 1001 0101 1011 |

The MAJ code is a balanced code.

In order to produce I and Q MAJ codes which are orthogonal, none of the component codes can be the same. One method of accomplishing this is to use the $Z^{\phi 2}$ and the not-Y as in the MAND I and Q codes.

| | |
|---|---|
| X | 1001 1100 0110 1110 0100 1001 0101 1010 |
| $\bar{Y}$ | 0111 1010 1000 1101 1100 0010 1100 1010 |
| $Z^{\phi 2}$ | 1100 0101 1000 1010 1100 0111 1010 1100 |
| MAJ | 1101 1100 1000 1110 1100 0011 1100 1010 |

The correlation of the I and Q MAJ codes:

| | |
|---|---|
| $MAJ_I$ | 1101 1100 1000 1110 1100 0011 1100 1010 |
| $MAJ_Q$ | 1000 0101 0110 0110 0001 1001 0101 1011 |

The correlation is 0, showing orthogonality.
The correlation of $X \oplus Y$ with MAJ:

| | |
|---|---|
| X | 1001 1100 0110 1110 0100 1001 0101 1010 |
| Y | 1000 0101 0111 0010 0011 1101 0011 0101 |
| $X \oplus Y$ | 0001 1001 0001 1100 0111 0100 0110 1111 |
| MAJ | 1000 0101 0110 0110 0001 1001 0101 1011 |

The correlation is approximately 0.
Correlations between Various Example Codes:

The following is an example of correlation between MOD and MAND:

| | | |
|---|---|---|
| $X \oplus (Y \cdot Z)$ | 0001 1001 0000 1110 0101 0001 0101 1011 | |
| $X \oplus Y \oplus Z$ | 1101 1100 1111 1001 0110 1100 1010 0100 | |
| $\oplus$ | 1100 0101 1111 0111 0011 1101 1111 1111 | 16/32 |

Resulting in approximately a −6 dB correlation. The X is common on both so we could also leave it off and the result is the same:

| | |
|---|---|
| $Y \cdot Z$ | 1000 0101 0110 0000 0001 1000 0000 0001 |
| $Y \oplus Z$ | 0100 0000 1001 0111 0010 0101 1111 1110 |

The comparison of MAND and MOD for the I codes:

| | | |
|---|---|---|
| $X \oplus Y^{\phi 2} \oplus Z^{\phi 2}$ | 0001 0111 0111 0010 1100 0101 1100 1111 | |
| $X \oplus (Y^{\phi 2} \cdot Z^{\phi 2})$ | 1101 1000 1110 1100 0000 1010 0111 0010 | |
| $\oplus$ | 1100 1111 1001 1110 1100 1111 1011 1101 | 14/32 |

Again resulting in approximately a −6 dB correlation. More combinations are presented below:

| | | |
|---|---|---|
| W | 1110 0110 1000 1011 0010 1001 1100 0010 | |
| $Z^{\phi 2}$ | 1100 0101 1000 1010 1100 0111 1010 1100 | |
| $W \cdot Z^{\phi 2}$ | 1100 0100 1000 1010 0000 0001 1000 0000 | |
| $W \cdot Z^{\phi 2}$ | 1100 0100 1000 1010 0000 0001 1000 0000 | |
| $Y \cdot Z$ | 1000 0101 0110 0000 0001 1000 0000 0001 | 8/32 |
| X | 1001 1100 0110 1110 0100 1001 0101 1010 | |
| $\bar{Y} \cdot Z^{\phi 2}$ | 0100 0000 1000 1000 1100 0010 1000 1000 | |
| $X \oplus (\bar{Y} \cdot Z^{\phi 2})$ | 1101 1100 1110 0110 1000 1011 1101 0010 | |
| $V \cdot W$ | 1100 0010 1000 0001 0000 1000 0100 0010 | |
| X | 1001 1100 0110 1110 0100 1001 0101 1010 | |
| $X \oplus (V \cdot W)$ | 0101 1110 1110 1111 0100 0001 0001 1000 | |

Correlation of codes with MAJ:

| | | |
|---|---|---|
| MAJ | 1000 0101 0110 0110 0001 1001 0101 1011 | |
| X | 1001 1100 0110 1110 0100 1001 0101 1010 | |
| $\oplus$ | 0001 1001 0000 1000 0101 0000 0000 0001 | +18/32 |
| MAJ | 1000 0101 0110 0110 0001 1001 0101 1011 | |
| Y | 1000 0101 0111 0010 0011 1101 0011 0101 | |
| $\oplus$ | 0000 0000 0001 0100 0010 0100 0110 1110 | +14/32 |
| MAJ | 1000 0101 0110 0110 0001 1001 0101 1011 | |
| Z | 1100 0101 1110 0101 0001 1000 1100 1011 | |
| $\oplus$ | 0100 0000 1000 0011 0000 0001 1001 0000 | +18/32 |

Each of the component codes will correlate with the MAJ code. Keep in mind as above that, since these are short example sequences, the correlation is not exactly that of a proper sequence.

| | | |
|---|---|---|
| MAJ | 1000 0101 0110 0110 0001 1001 0101 1011 | |
| $X \oplus (Y \cdot Z)$ | 1110 0110 1111 0001 1010 1110 1010 0100 | |
| $\oplus$ | 0110 0011 1001 0111 1011 0111 1111 1111 | −14/32 |

The MAND code correlates with the MAJ code.

| | | |
|---|---|---|
| MAJ | 1000 0101 0110 0110 0001 1001 0101 1011 | |
| $X \oplus Y \oplus Z$ | 1101 1100 1111 1001 0110 1100 1010 0100 | |
| $\oplus$ | 0101 1001 1001 1111 0111 0101 1111 1111 | −14/32 |

The MOD code correlates with the MAJ code.

| | | |
|---|---|---|
| MAJ | 1000 0101 0110 0110 0001 1001 0101 1011 | |
| $Y \cdot Z$ | 1000 0101 0110 0000 0001 1000 0000 0001 | |
| $\oplus$ | 0000 0000 0000 0110 0000 0001 0101 1010 | +18/32 |

Y·Z also correlates with the MAJ code.

| | | |
|---|---|---|
| MAJ | 1000 0101 0110 0110 0001 1001 0101 1011 | |
| Y ⊕ Z | 1011 1111 0110 1000 1101 1010 0000 0001 | |
| ⊕ | 0011 1010 0000 1110 1100 0011 0101 1010 | +2/32 |

Y⊕Z does not correlate with the MAJ code.
Another way of showing the code combining logic:

| | MAJ | MAND | MOD |
|---|---|---|---|
| X | 01010101 | 01010101 | 01010101 |
| Y | 00110011 | 00110011 | 00110011 |
| interm. result | | 00010001 | 01100110 |
| Z | 00001111 | 00001111 | 00001111 |
| Result | 00010111 | 00011110 | 01101001 |

In general, to produce an orthogonal pair of I and Q composite PN codes from the same three mutually independent component PN codes, logically combine the three component codes in some way to produce one output PN signal, and then do so again but using an inverse and/or a different phase of at least one of the component PN codes to produce the other output PN signal orthogonal to the first signal.

Further, to be able to acquire the composite output PN signal at a receiver with a minimum intercept capability, one of the composite codes is provided with an imbalance so that it has partial correlation with the received composite code to permit fast acquisition.

Some of the many advantages of the invention should now be readily apparent. For example, novel apparatus and method have been provided for generating PN code sequences and for combining data with the resulting PN codes. Such apparatus and method is particularly well suited to producing a plurality of orthogonal code pairs, all composed of a single set of component codes. Such apparatus and method are useful for producing I and Q PN codes with low cross-correlation properties, without duplicating what is needed to generate the component codes. The resulting composite I and Q codes have certain desired partial correlation properties, which result from the proper combining of the component codes. Also, novel apparatus and method have been provided for producing an orthogonal pair of I and Q PN codes composed of three individual component codes, in which the same component codes are used to produce both of the I and Q composite codes. Only one set of component code generators is needed to make one or more orthogonal PN code pairs, thereby saving hardware. Also, one of the component codes can be utilized unmodified for producing both codes of the I and Q pair.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus and method for generating a plurality of mutually orthogonal sequence signals, comprising:

a clock;

a first plurality of PN code generators each clocked by said clock and each producing a PN sequence signal, said resulting first plurality of PN sequence signals being independent of each other, wherein each of said first plurality of PN sequence generators also produces a signal representing the inverse of its PN sequence signal and signal representing another phase of its PN sequence signal; and code combining means, receiving said first plurality of PN sequence signals, said first plurality of inverted PN sequence signals and said first plurality of differently phased PN sequence signals, for producing a second plurality of mutually orthogonal PN sequence signals, wherein each of said second plurality of PN sequence signals represents a PN sequence that is longer than any of the first plurality of PN sequence signals, the first plurality of inverted PN sequence signals and the first plurality of differently phased PN sequence signals.

2. Apparatus as defined in claim 1 wherein said second plurality of PN sequence signals comprises a pair of PN sequence signals that are related in that one signal of that pair is an in-phase signal and the other signal of that pair is in quadrature to the in-phase signal, and are mutually orthogonal.

3. Apparatus as defined in claim 1 wherein the second plurality of mutually orthogonal PN sequence signals comprises a plurality of pairs of PN sequence signals that are mutually orthogonal.

4. Apparatus as defined in claim 3 wherein at least one of those signal pairs is produced by MOD combining the first plurality of component codes.

5. Apparatus as defined in claim 3 wherein at least one of those signal pairs is produced by MAJ combining the first plurality of component codes.

6. Apparatus as defined in claim 3 wherein at least one of those signal pairs is produced by MAND combining the first plurality of component codes.

7. A method for producing pairs of uncorrelated orthogonal PN sequences, comprising the steps of:

producing a first plurality of commonly clocked independent PN sequences;

combining two of said independent sequences in a manner to produce a resulting combined PN sequence having an overall imbalance of ones and zeros in the binary expression of said resulting combined PN sequence; and combining said resulting combined PN sequence with another of the first plurality of PN independent sequences to provide a composite PN code having partial correlation.

8. A method for producing one or more uncorrelated orthogonal PN code pairs composed of a single set of component PN codes, comprising the steps of:

producing a first plurality greater than two of PN sequences as the single set of component codes;

after said producing step, first logically combining in a first manner a first and a second one of the first plurality of PN sequences to produce a first resulting combined PN sequence whose binary expression has an overall imbalance of ones and zeros;

after said producing step, second logically combining in the first manner the inverse of the first PN sequence with a different phase of the second Pn sequence to produce a second resulting combined PN sequence;

after said first logically combining step, logically combining in a second manner the first resulting combined PN sequence with the third of the plurality of Pn sequences to produce a first composite PN output signal; and after said second combining step, logically combining in the second manner the second resulting PN sequence with a third of the first plurality of PN sequences to produce a second composite PN output signal orthogonal to and uncorrelated with the first PN output signal.

9. A method as defined in claim 8 wherein:

the first manner of logically combining is logically ANDing; and the second manner of logically combining is exclusive-ORing.

10. A method as defined in claim 8 wherein:

the first manner of logically combining is ANDing the first plurality of PN sequences together two at a time; and the second manner of logically combining is ORing together the results of the immediately preceding step.

11. A method for producing at least one orthogonal PN code pair, comprising the steps of:

producing a first plurality of mutally independent commonly clocked PN sequences;

after said producing step, first combining at least some of the first plurality of PN sequences in a first manner to produce at least one first combined PN sequence;

after said producing step, second combining at least two of the first plurality of PN sequences in the first manner, wherein at least one but not all of the first plurality of PN sequences is first inverted, to produce at least one second combined PN sequence;

after said first combining step, combining said at least one first combined PN sequence, and any remaining PN sequences of said first plurality that have not been so combined, together in a second logical manner to produce a first output PN sequence; and after second first combining step, combining said at least one second combined PN sequence, and any remaining PN sequences of said first plurality that have not been so combined, together in a second logical manner to produce a second output PN sequence which is at least substantially orthogonal to the first output PN sequence.

* * * * *